Perry & Lazell,

Bottle Stopper,

N°49,916.   Patented Sept. 12, 1865.

Attest:
J. M. Covington
C. L. Topliff

Inventors:
E. L. Perry
E. D. Lazell

UNITED STATES PATENT OFFICE.

E. L. PERRY, OF NEW YORK, AND E. D. LAZELL, OF BROOKLYN, N. Y.

IMPROVED ARTIFICIAL CORK.

Specification forming part of Letters Patent No. 49,916, dated September 12, 1865.

*To all whom it may concern:*

Be it known that we, E. L. PERRY, of the city, county, and State of New York, and E. D. LAZELL, of Brooklyn, Kings county, New York, have invented a new and useful Improvement in Corks; and we do hereby declare that the following is a full, clear, and exact description thereof, which will enable those skilled in the art to make and use the same, reference being had to the accompanying drawings, forming part of this specification.

This invention consists in making corks of a composition of gutta-percha or india-rubber or other fibrous gums, mixed with ground cork or sawdust or some other substance containing similar qualities, whereby we produce a cheap and reliable cork or stopper for apothecaries use, and for hermetically sealing jars of fruit and preserves, and for bungs for barrels, casks, kegs, &c., and for many other purposes.

The accompanying drawings represent our cork applied to a fruit-jar.

Figure 1:
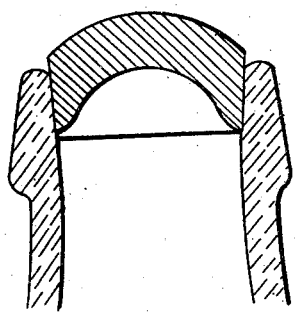
Figure 2:
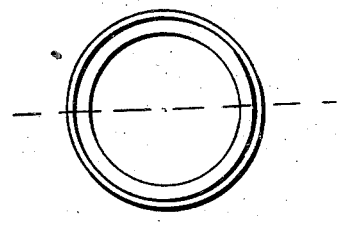

Figure 1 is a central vertical section of the cork, taken in the line, $x\,x$, Fig. 2, showing the form we have found best adapted for hermetically-sealing purposes. Fig. 2 is a bottom view of the cork, or a view of the portion which is inserted in the neck of the jar, showing a cavity in the same.

In the manufacture of these corks we take gutta-percha, one part; ground cork, two parts; litharge, six-sixteenths parts; sulphur, one-sixteenth part and put them into a machine usually employed for mixing india-rubber or gutta-percha until they are thoroughly mixed. The composition is then formed in molds and vulcanized by the usual or any suitable process at a temperature, say, of from 230° to 260° Fahrenheit.

The gutta-percha used is not pure gum, but it is the gum after it has been put through a process preparatory to vulcanizing, and is called "preliminaried gum."

The process for making the preliminaried gum is this: The gum (in crude) is first softened and dried in a hot mill. Then a certain quantity of sulphur and litharge is added, and it is then put into a vat of water and subjected to a steam-heat of, say, 240° Fahrenheit, for about six hours. This partially cleans it and relieves it of all impurities—such as acid, resin, alkali, &c.—and renders it indissoluble. The compound thus made is called "preliminaried gum."

The specimen illustrated in the drawings is made of the above composition.

The cork shown in this example of our invention is made concave in its lower side, for the purpose of saving material, as well as to enable its lower part to be more readily pressed together for insertion in the jar. It possesses the quality of lightness, which is very desirable in articles of this kind, and also the quality of elasticity, while the rubber or gutta-percha body, which is impervious to air or water, makes the stopper perfectly tight, giving to any vessel to which it is applied the character of being hermetically sealed.

When using these corks it will be found advantageous to put them in warm water—say for a moment or two—till they easily yield to pressure, when they can be crowded tightly into the neck of the preserve-jar or other article; but they can be used without warming in the same manner as common corks, though more pressure will, of course, be required to insert them properly in preserve-jars than in ordinary bottles and jars.

In hermetically sealing fruits and preserves they are put into the jar in a heated state, in the usual manner, and the corks are driven in. When the fruit or preserves become cool the air loses its expanded condition, and none whatever can be admitted from the outside, for the reason that corks made of this substance are perfectly impenetrable by air. They have no smell nor taste, and their use obviates the necessity of putting tin-foil or any such substance over the tops of the jars. The qualities therefore of this cork for hermetically sealing fruit and preserve jars will be found very superior.

In manufacturing corks for common purposes no vulcanization will be necessary, and they will answer the purposes for which they may be employed in a perfectly satisfactory manner.

We have named gutta-percha and ground cork in the proportion of one part of the former to two parts of the latter, but the proportions can be considerably varied and produce a very satisfactory result, as we have found by experiment, as may also be done with regard to the other ingredients.

India-rubber or other fibrous gums may be used instead of gutta-percha, and sawdust or some other vegetable or mineral substance may be used instead of the cork.

We will here remark that aside from the use of this composition for corks we have found it to answer admirably as a material of which to make door-mats and many other articles which require lightness and elasticity.

When these corks are to be used by apothecaries, chemists, and others in the presence of acids, the body or matrix which contains the ground cork or vegetable matter should be made of gutta-percha, since that substance is not liable to corrosion by acids. The gutta-percha matrix completely covers and conceals the grains of cork or other matter dispersed and mixed through it, and so protects them from the attack of acids and other substances contained in the vessels which are closed by the corks.

The corks may be withdrawn from the jars or bottles by an ordinary cork-screw without damage or injury of any kind to the cork.

What we claim as new, and desire to secure by Letters Patent, is—

A cork for chemical and apothecaries' use and for hermetically sealing fruit and preserve jars, and for other purposes, made substantially as herein specified.

EDWARD L. PERRY.
ELLIS D. LAZELL.

Witnesses:
M. M. LIVINGSTON,
WM. F. MCNAMARA.